(12) United States Patent
Wang

(10) Patent No.: US 7,030,744 B2
(45) Date of Patent: *Apr. 18, 2006

(54) ALERT DEVICE FOR PNEUMATIC OBJECT

(76) Inventor: Hsug Fang Wang, 1554 Kiowa Crest Dr., Diamond Bar, CA (US) 91765

( * ) Notice: Subject to any disclaimer, the term of this patent is extended or adjusted under 35 U.S.C. 154(b) by 26 days.

This patent is subject to a terminal disclaimer.

(21) Appl. No.: 10/786,645

(22) Filed: Feb. 26, 2004

(65) Prior Publication Data

US 2004/0164853 A1    Aug. 26, 2004

Related U.S. Application Data

(62) Division of application No. 10/057,348, filed on Jan. 28, 2002, now Pat. No. 6,762,677.

(51) Int. Cl.
    *B60C 23/00*     (2006.01)
(52) U.S. Cl. ...................... 340/442; 340/445; 73/146.5; 116/34 R
(58) Field of Classification Search ................ 340/442, 340/445, 443, 444, 446, 447, 449; 73/146.5, 73/146.4; 116/34 R, 34 A, 34 B; 152/152.1, 152/415
See application file for complete search history.

(56) References Cited

U.S. PATENT DOCUMENTS

| | | | | |
|---|---|---|---|---|
| 5,040,562 A | * | 8/1991 | Achterholt | 137/227 |
| 5,301,553 A | * | 4/1994 | Schultz et al. | 73/705 |
| 5,581,023 A | * | 12/1996 | Handfield et al. | 73/146.5 |
| 5,889,464 A | * | 3/1999 | Huang | 340/442 |
| 6,591,671 B1 | * | 7/2003 | Brown | 73/146.5 |
| 6,629,454 B1 | * | 10/2003 | Lundqvist | 73/146.8 |
| 6,762,677 B1 | * | 7/2004 | Wang | 340/442 |

* cited by examiner

*Primary Examiner*—Anh V. La
(74) *Attorney, Agent, or Firm*—Raymond Y. Chan; David & Raymond

(57) ABSTRACT

An alert device, which is adapted for mounting to a valve of a pneumatic object, is capable of detecting any decrease in the interior pneumatic pressure of the pneumatic object and generating a warning signal immediately therefor. The alert device includes a signal arrangement and a connector, wherein the signal arrangement includes a cap, a signal generator fittingly received in the cap, and a power supply arrangement comprising a first contact unit and a second contact unit, and the connector comprises a power inlet and a power outlet.

20 Claims, 3 Drawing Sheets

US 7,030,744 B2

ALERT DEVICE FOR PNEUMATIC OBJECT

CROSS REFERENCE OF RELATION APPLICATION

This is a divisional application that claims the benefit of priority under 35 U.S.C.§119(e) to a non-provisional application, application Ser. No. 10/057,348, filed Jan. 28, 2002 now U.S. Pat. No. 6,762,677, the entire contents of which is incorporated herewith by reference.

BACKGROUND OF THE PRESENT INVENTION

1. Field of Invention

The present invention relates to an alert device for pneumatic object, and more particularly relates to an alert device which is attached to a valve of the pneumatic object, so that when the pressure inside the pneumatic object decreases due to gas leakage or other reasons, a signal will be generated.

2. Description of Related Arts

Pneumatic objects are widely used in different aspects in our everyday lives such as balloon and pneumatic toys for entertainment, tires and pneumatic boats in transportation, pneumatic safe guards for life saving. However, people will not pay attention to the condition of the pneumatic objects all the time while using them, so when the pressure inside the pneumatic object is not sufficient, people may not be aware and alert. It may not be important for gas leakage from the pneumatic toys or balloons. However, if the gas leakage is happened during the use of tires and pneumatic boats for transportation or pneumatic safe guards for life saving, it will increase the risk of driving a car or monitoring a boat or loss of one's life as the pneumatic safe guard cannot function.

SUMMARY OF THE PRESENT INVENTION

The main object of the present invention is to provide an alert device for pneumatic object, wherein the alert device is adapted for mounting in a valve of the pneumatic object and to detect the interior pneumatic pressure of the pneumatic object. A warning signal is immediately generated when the interior pneumatic pressure of the pneumatic object is lowered than a predetermined safety pressure. Therefore, when the pneumatic pressure of the pneumatic object is insufficient to timely replace or repair the pneumatic object before the happening of any tragedies, users can be alert with the signal.

Another object of the present invention is to provide an alert device for pneumatic object, wherein the alert device comprises a connector that controls the opening and closing of a circuit such that the alert device is in an open circuit condition and consumes no electricity when the pneumatic pressure of the pneumatic object is higher than a predetermine pressure. The alert device is in a close circuit condition and generates a warning signal when the pneumatic pressure of the pneumatic object is lower than the predetermined pressure.

In order to accomplish the above objects, the present invention provides an alert device, comprising:

a signal arrangement which comprises a cap, a signal generator fittingly received in said cap and a power supply arrangement which comprises a first contact unit connected to said generator and a second contact unit; and a connector, adapted for connecting to a valve of a pneumatic object, further comprising a power inlet connected to said second contact unit of said power supply arrangement and a power outlet connected to said signal generator, wherein said power inlet and said power outlet are arranged to electrically disconnect with each other when the pneumatic object has a pneumatic pressure equal to or higher than a predetermined pressure, wherein when said pneumatic pressure of said pneumatic object is lower than said predetermined level, said power inlet and said power outlet is electrically connected to transmit electricity from said power inlet through said second contact unit of said power supply arrangement to said power outlet to generate a warning signal.

DETAILED DESCRIPTION OF THE PREFERRED EMBODIMENT

Figure 1:
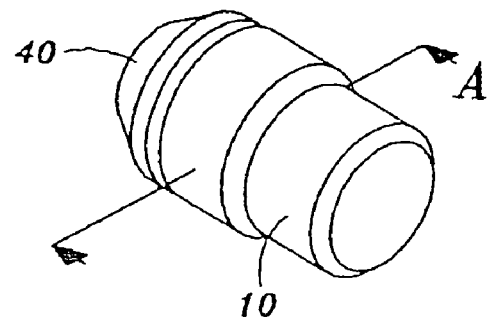
FIG. 1 is a perspective view of the present invention.
Figure 2:
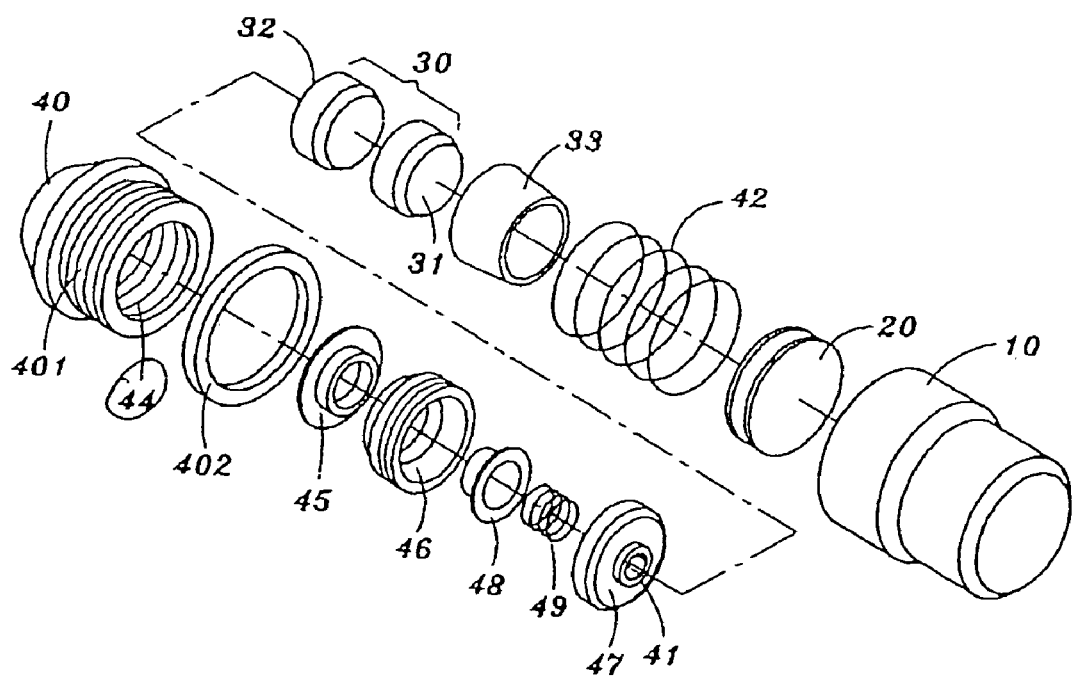
FIG. 2 is an exploded view of the present invention.

Referring to FIGS. 1 to 4, the present invention is an alert device for detecting an interior pneumatic pressure of a pneumatic object, such as vehicle tires, pneumatic boats, and etc. The alert device comprises a signal arrangement 1 and a connector 40.

The signal arrangement 1 comprises a cap 10, a signal generator 20 received in the cap 10, and a power supply arrangement 30.

The power supply arrangement 30, comprising a first contact unit 31 connected to the signal generator 20 and a second contact unit 32 connected to the connector 40.

Figure 4:
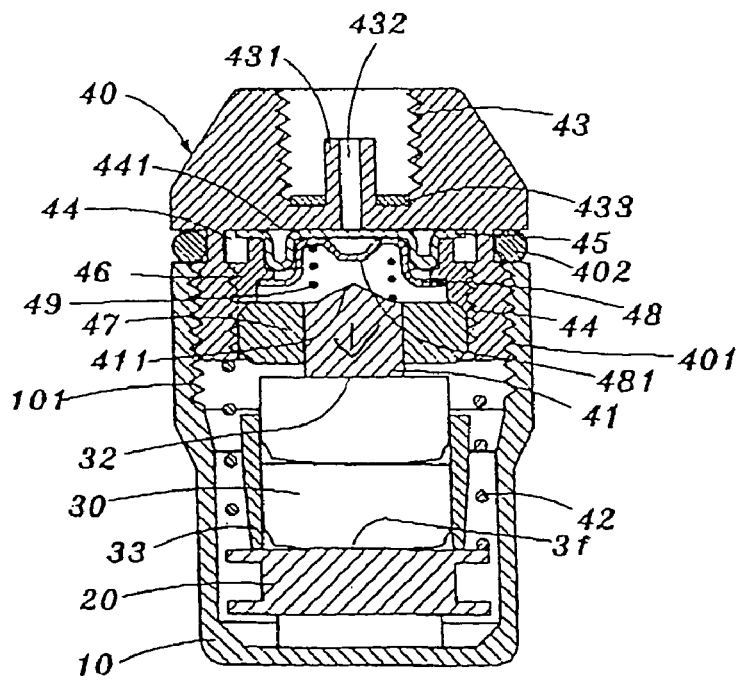
FIG. 4 is the sectional view of the present invention when a valve of a pneumatic object is under pressure.

The connector 40 comprises a power inlet 41 connected to the second contact unit 32 of the power supply arrangement 30 and a power outlet 42 connected to the signal generator 20, so that the connector 40 is mounted to a valve of the pneumatic object for detecting the interior pneumatic pressure of the pneumatic object. When the pneumatic pressure is equal to or higher than a predetermined standard pressure, the power inlet 41 and the power outlet 42 is spaciously arranged to electrically disconnect with each other since the power inlet 41 is being pressed in a pressing status. When the pneumatic pressure is lower than the predetermined standard pressure, the power inlet 41 and the power outlet 42 is electrically connected since the power inlet 41 is being released as shown in FIG. 4. Therefore, the second contact unit 32 of the power supply arrangement 30 is capable of electrically connecting the power supply arrangement and the signal generator 20 through the power outlet 42 to generate warning signals.

Referring to FIGS. 1 to 4, the connector 40, which is made of metallic materials, has two communicating units, namely a first communicating unit 43 and a second communicating unit 44, on two ends respectively. The first communicating unit 43 is adapted for connecting to the valve of the pneumatic object and the second communicating unit 44 has a bottom surface 441. The connector 40 further comprises an interior protruded head 431 transversely extended from the first communicating unit 43 of the connector 40 to a through hole 432 of the bottom surface 441 of the second communicating unit 44 of the connector 40. Therefore, when the connector 40 is mounted to the valve of the pneumatic object, the interior protruded head 431 is capable of connecting to the valve of the pneumatic object in such a manner that gas inside the pneumatic object presses to the bottom surface 441 of the second communicating unit 44 through the through hole 432.

The connector 40 further comprises an insulating plate 45 positioned on the bottom surface 441, wherein the second communicating unit 44 of the connector 40 further comprises a conductor 46 surrounding a peripheral portion of the insulating plate 45 and mounting on the second communicating unit 44 for securely connecting the insulating plate 45 with the second communicating unit 44 of the connector 40, so that the insulating plate 45 is capable of biasing towards the bottom surface 441 of the second communicating unit 44 of the connector 40. The connector 40 is adapted to have a detecting cavity 451, defined between the bottom surface 441 and the insulating plate 45 when the gas inside the pneumatic object moves towards the second communicating unit 44 of the connector 40.

The second communicating unit 44 further has an opening, wherein an insulative element 47 is fittingly received in the opening of the second communicating unit 44 and connected to the power inlet 41.

The connector 40 further comprises a conducting unit 48 and a resilient element 49 positioned between the insulative element 47 and the insulating plate 45, wherein the conducting unit 48 have a first side biasing to the insulating plate 45 and a second side biasing against a free end of the resilient element 49.

The power outlet 42 comprises a spring pressing against to a top surface of the second communicating unit 44 of the connector 40.

Figure 3:
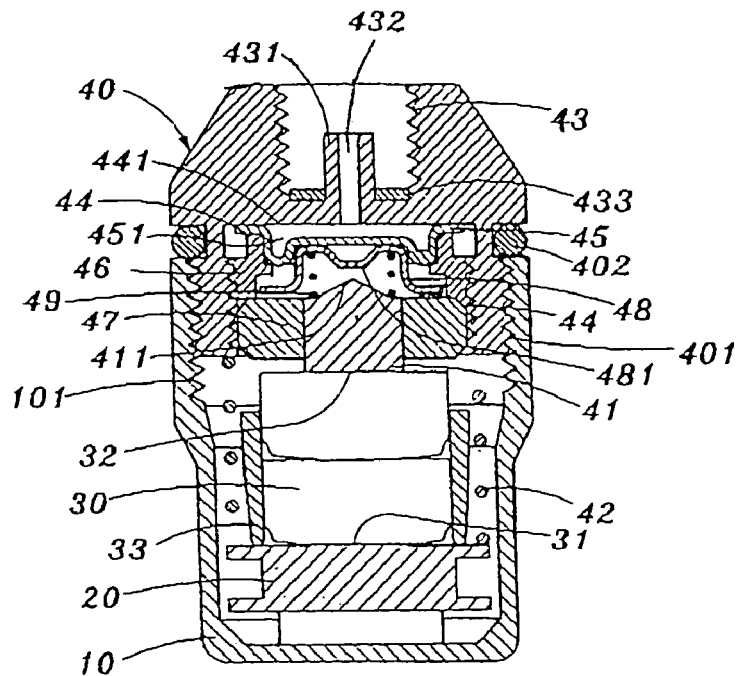
FIG. 3 is a sectional perspective view of the present invention.

Referring to FIG. 3, the detecting cavity 451 is formed when the connector 40 is inflated with gas, wherein the gas will press against the conducting unit 48 and the corresponding resilient element 49. The resilient element 49 is being compressed and shortened in length to define a predetermined distance between the conducting unit 48 and the conductor 46 such that the conducting unit 28 and the conductor 46 is not connected.

Referring to FIG. 4, when the pneumatic pressure is lowered to the predetermined standard pressure that is lower than a strength of the resilient element 49, the resilient element 49 will stretch and push the conducting unit 48 towards the conductor 46, such that the power inlet 41 is electrically connected to the power outlet 42 through the resilient element 49 to the conducting unit 48 with the top end of the connector 40. Therefore, the signal generator 20 is electrically connected to the power supply arrangement and generate a warning signal.

Under normal situation, that is, when the pneumatic pressure is higher than the predetermined standard pressure, the connector 40 will not use up any electricity of the power supply arrangement 30 because the connector 40 is not electrically connected to the power supply arrangement 30. Therefore, when the interior pneumatic pressure of the pneumatic object is lowered than the predetermined standard pressure, the signal generator 20 is capable of immediately electrically connecting to the connector 40 and generating warning signals. Thus, the drawback of having no signal generation due to using up of electricity by the connector 40 under normal situation is eliminated.

Referring to FIG. 3 and FIG. 4, the conductor 46 has a jaw-shaped interior surface for fittingly receiving a peripheral surface of the conducting unit 48 when the conducting unit 48 is biased against by the resilient element 49, as shown in FIG. 4, such that the conducting unit 48 and the conductor 46 is more fittingly and electrically connected.

Furthermore, the conducting unit 48 further has a protruded unit 481 and is cylindrical in shape for fittingly connected with the free end of the resilient element 49.

The power inlet 41, which is connected to a mounting end of the resilient element 49, further comprises a mounting unit 411 with respect to the protruded unit 481 of the conducting unit 48, such that the free end and the mounting end of the resilient element 49 is capable of securely connected to the power inlet 41 and the conducting unit 48 respectively. Therefore, the resilient element 49 will not be displaced by any movement of the pneumatic object and be securely positioned.

Moreover, the connector 40 comprises a main body having a tooth-shaped outer surface 401, wherein the cap 10 has an inner surface 101 for fittingly receiving the outer surface 401 of the connector 40. Therefore, when the cap 10 is connected to the connector 40, two side ends of the spring of the power outlet 42 are pressed against an end of the connector 40 and the signal generator 20 respectively, wherein the power supply arrangement 30 further comprises an insulating cover 33 to avoid any contact with the spring of the power outlet 42.

The outer surface 401 of the connector 40 further comprises an O-shaped cover surrounding a peripheral connecting junction between the connector and the cap for stopping any water penetration when the pneumatic object is used in wet environment.

The bottom surface 431 of the first communicating unit 43 of the connector 40 further comprises a plastic element 433 attached on the connector 40 for connecting a valve A1 of the pneumatic object A to prevent the leakage of gas.

Figure 5:
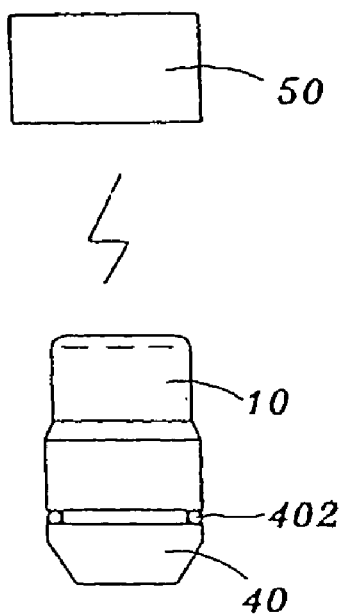
FIG. 5 is the perspective view of the present invention with a receiver.

Referring to FIG. 5, the present invention further comprises a receiver 50 communicated with the signal generator 20 adapted for receiving the warning signal from the signal generator 20 and transforming the warning signal to other forms such as language output or visual display to alert a user immediately so that the user is able to change or repair the pneumatic object before the happening of any accident due to insufficient pressure inside the pneumatic object.

Figure 6:
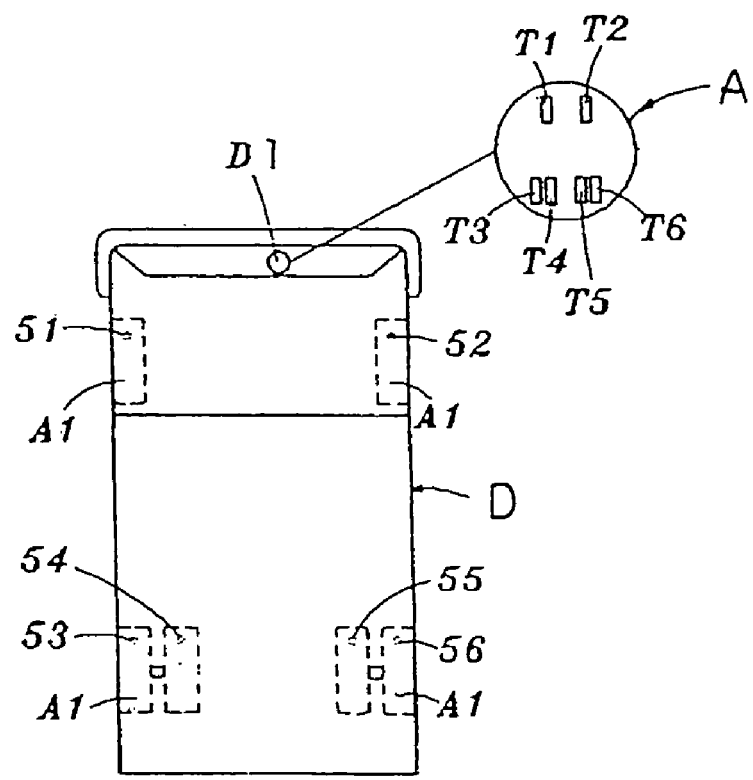
FIG. 6 is the perspective view of the present invention being installed in a tire of a car.

Referring to FIG. 6, the present invention comprises a plurality of alert devices of the present invention T1, T2, T3, T4, T5 and T6, illustrated as the broken line, and a display unit D, wherein each of the warning devices is installed to a respective tire's valve in a vehicle A, wherein the display unit D which is positioned inside the vehicle A comprises a signal receiver Al and a plurality of signal indicators 51, 52, 53, 54, 55 and 56 arranged corresponding to the signal frequencies of the alert devices T1, T2, T3, T4, T5 and T6 of different tires respectively. Therefore, when the pneumatic pressure of any tire of the vehicle A reduces under the predetermined standard pressure, the signal receiver Al receives the specific warning signal with specific frequency from the respective alert device T1, T2, T3, T4, T5, or T6, and triggers the corresponding signal indicator 51, 52, 53, 54, or 55 to generate a lighting signal, so that the user can aware of the status of each tire independently and discover any gas leakage to prevent accident inside the Vehicle A.

Moreover, the display unit D may further include a warning sound generator to produce a warning sound signal when any of the signal indicator 51 to 55 is activated.

What is claimed is:

1. An alert system for vehicle tire, comprising at least an alert device provided at a tire valve of the vehicle tire, wherein said alert device comprises:
   a signal arrangement which comprises a cap, a signal generator received in said cap, and a power supply arrangement which comprises a first contact unit connected to said generator and a second contact unit; and
   a connector, for connecting to the tire valve of the vehicle tire, which has a detecting cavity for communicating with an interior pneumatic pressure of the vehicle tire and comprises:
   a conductor disposed in said detecting cavity;
   a conducting unit normally positioned apart from said connector;
   a resilient element disposed between said connector and said conducting unit for applying a force against said conducting unit towards said connector;
   a power inlet connected to said second contact unit of said power supply arrangement; and
   a power outlet connected to said signal generator, wherein when the interior pneumatic pressure of the vehicle tire is higher than a predetermined standard pressure, said conducting unit is spaced apart from said conductor such that said power inlet and said power outlet are electrically disconnect with each other, wherein when the interior pneumatic pressure of the vehicle tire is lower than said predetermined standard pressure, said resilient element pushes said conducting unit to contact with said conductor such that said power inlet and said power outlet are electrically connected to transmit electricity from said power inlet through said second contact unit of said power supply arrangement to said power outlet and generate a warning signal.

2. The alert system, as recited in claim 1, wherein said connector further comprises a first communicating unit for connecting to the tire valve of the vehicle tire and a second communicating unit spaced apart from said first communicating unit to hold said conductor in position.

3. The alert system, as recited in claim 2, wherein said connector comprises an insulating plate positioned at a bottom surface of said second communicating unit, wherein said conductor is mounted on said second communicating unit at a position to surround a peripheral portion of said insulating plate so as to securely connect said insulating plate with said second communicating unit, wherein said detecting cavity is defined between said bottom surface of said second communicating unit and said insulating plate when resilient element is compressed and shortened in length by the interior pneumatic pressure of the vehicle tire.

4. The alert system, as recited in claim 1, wherein said connector further comprises a main body having a toothshaped outer surface, wherein an opening of said cap has an inner surface to receive said outer surface of said connector so as to securely connect said cap to said connector.

5. The alert system, as recited in claim 3, wherein said connector further comprises a main body having a toothshaped outer surface, wherein an opening of said cap has an inner surface to receive said outer surface of said connector so as to securely connect said cap to said connector.

6. The alert system, as recited in claim 1, wherein said alter deice further comprises a signal receiver communicated with said signal generator adapted for receiving a signal from said signal generator and transforming the signal to an audio output or a visual display for illustrating said warning signal with respect to said alert device that produces said warning signal.

7. The alert system, as recited in claim 3, wherein said alter device further comprises a signal receiver communicated with said signal generator adapted for receiving a signal from said signal generator and transforming the signal to an audio output or a visual display for illustrating said warning signal with respect to said alert device that produces said warning signal.

8. The alert system, as recited in claim 5, wherein said alter device further comprises a signal receiver communicated with said signal generator adapted for receiving a signal from said signal generator and transforming the signal to an audio output or a visual display for illustrating said warning signal with respect to said alert device that produces said warning signal.

9. The alert system, as recited in claim 6, wherein said signal receiver has a plurality of receiving channels correspondingly to various signal frequencies so as to distinguish said warning signal received from said alert device.

10. The alert system, as recited in claim 7, wherein said signal receiver has a plurality of receiving channels correspondingly to various signal frequencies so as to distinguish said warning signal received from said alert device.

11. The alert system, as recited in claim 8, wherein said signal receiver has a plurality of receiving channels correspondingly to various signal frequencies so as to distinguish said warning signal received from said alert device.

12. An alert device, comprising:
   a signal arrangement which comprises a cap, a signal generator received in said cap, and a power supply arrangement which comprises a first contact unit connected to said generator and a second contact unit; and
   a connector, adapted for mounting to a valve of a pneumatic object, which has a detecting cavity for communicating with a pneumatic pressure of the pneumatic object and comprises:
   a conductor disposed in said detecting cavity;
   a conducting unit normally positioned apart from said connector;
   a resilient element disposed between said connector and said conducting unit for applying a force against said conducting unit towards said connector;
   a power inlet connected to said second contact unit of said power supply arrangement; and
   a power outlet connected to said signal generator, wherein when the pneumatic pressure of the pneumatic object is higher than a predetermined standard pressure, said conducting unit is spaced apart from said conductor such that said power inlet and said power outlet are electrically disconnect with each other, wherein when the pneumatic pressure of the pneumatic object is lower than said predetermined standard pressure, said resilient element pushes said conducting unit to contact with said conductor such that said power inlet and said power outlet are electrically connected to transmit electricity from said power inlet through said second contact unit of said power supply arrangement to said power outlet and generate a warning signal.

13. The alert device, as recited in claim 12, wherein said connector further comprises a first communicating unit for connecting to the tire valve of the vehicle tire and a second communicating unit spaced apart from said first communicating unit to hold said conductor in position.

14. The alert device, as recited in claim 13, wherein said connector comprises an insulating plate positioned at a bottom surface of said second communicating unit, wherein said conductor is mounted on said second communicating unit at a position to surround a peripheral portion of said insulating plate so as to securely connect said insulating plate with said second communicating unit, wherein said detecting cavity is defined between said bottom surface of said second communicating unit and said insulating plate when resilient element is compressed and shortened in length by the interior pneumatic pressure of the vehicle tire.

15. The alert device, as recited in claim 12, wherein said connector further comprises a main body having a tooth-shaped outer surface, wherein an opening of said cap has an inner surface to receive said outer surface of said connector so as to securely connect said cap to said connector.

16. The alert device, as recited in claim 14, wherein said connector further comprises a main body having a tooth-shaped outer surface, wherein an opening of said cap has an inner surface to receive said outer surface of said connector so as to securely connect said cap to said connector.

17. The alert device, as recited in claim 12, wherein said alter deice further comprises a signal receiver communicated with said signal generator adapted for receiving a signal from said signal generator and transforming the signal to an audio output or a visual display for illustrating said warning signal with respect to said alert device that produces said warning signal.

18. The alert device, as recited in claim 14, wherein said alter deice further comprises a signal receiver communicated with said signal generator adapted for receiving a signal from said signal generator and transforming the signal to an audio output or a visual display for illustrating said warning signal with respect to said alert device that produces said warning signal.

19. The alert device, as recited in claim 15, wherein said alter deice further comprises a signal receiver communicated with said signal generator adapted for receiving a signal from said signal generator and transforming the signal to an audio output or a visual display for illustrating said warning signal with respect to said alert device that produces said warning signal.

20. The alert device, as recited in claim 16, wherein said alter device further comprises a signal receiver communicated with said signal generator adapted for receiving a signal from said signal generator and transforming the signal to an audio output or a visual display for illustrating said warning signal with respect to said alert device that produces said warning signal.

* * * * *